United States Patent
Schafer et al.

(10) Patent No.: US 10,089,649 B1
(45) Date of Patent: Oct. 2, 2018

(54) ADVERTISING OF UNIQUELY IDENTIFIABLE OBJECTS

(71) Applicant: Long Tail Ventures, Inc., Winnipeg (CA)

(72) Inventors: Lance Schafer, Kelowna (CA); Jeremy Charney, Kelowna (CA); Daniel Legal, Winnipeg (CA)

(73) Assignee: LONG TAIL VENTURES, INC., Winnipeg (CA)

( * ) Notice: Subject to any disclaimer, the term of this patent is extended or adjusted under 35 U.S.C. 154(b) by 362 days.

(21) Appl. No.: 13/687,962

(22) Filed: Nov. 28, 2012

Related U.S. Application Data

(63) Continuation-in-part of application No. 13/523,703, filed on Jun. 14, 2012, now abandoned, and a continuation-in-part of application No. 13/523,823, filed on Jun. 14, 2012, now Pat. No. 8,818,857, which is a continuation-in-part of application No. 13/523,703, filed on Jun. 14, 2012, now abandoned, and a continuation-in-part of application No. 13/555,987, filed on Jul. 23, 2012, now abandoned, which is a continuation-in-part of application No. 13/523,703, filed on Jun. 14, 2012, now abandoned.

(51) Int. Cl.
   *G06Q 30/02* (2012.01)

(52) U.S. Cl.
   CPC ......... *G06Q 30/0251* (2013.01); *G06Q 30/02* (2013.01); *G06Q 30/0241* (2013.01); *G06Q 30/0249* (2013.01); *G06Q 30/0277* (2013.01)

(58) Field of Classification Search
   CPC ............. G06Q 30/02; G06Q 30/0241; G06Q 30/0249; G06Q 30/0251; G06Q 30/0277
   See application file for complete search history.

(56) References Cited

U.S. PATENT DOCUMENTS

| | | |
|---|---|---|
| 7,076,443 B1 * | 7/2006 | Emens et al. .............. 705/14.55 |
| 7,107,227 B1 | 9/2006 | Bezos et al. |
| 7,945,486 B2 | 5/2011 | Inghelbrecht et al. |
| 7,966,210 B2 | 6/2011 | Hall et al. |
| 8,027,977 B2 | 9/2011 | Thambiratnam et al. |
| 8,239,273 B1 | 8/2012 | Marshall et al. |
| 8,239,494 B2 | 8/2012 | Lunt et al. |
| 8,386,320 B2 | 2/2013 | Hayes et al. |
| 8,447,702 B2 | 5/2013 | Nicks |
| 8,473,349 B1 * | 6/2013 | Manber et al. ............ 705/14.49 |
| 8,566,166 B1 | 10/2013 | Jones et al. |
| 8,700,462 B2 | 4/2014 | Collins |
| 8,725,558 B1 * | 5/2014 | Lee et al. ..................... 705/14.1 |
| 2004/0093327 A1 * | 5/2004 | Anderson et al. ................. 707/3 |

(Continued)

OTHER PUBLICATIONS

International Search Report and Written Opinion for PCT/IB2017/000152 dated Jun. 27, 2017, 11 pages.

*Primary Examiner* — Meredith A Long
(74) *Attorney, Agent, or Firm* — Patent Law Works LLP

(57) ABSTRACT

A publisher web page comprising of any uniquely identifiable object is enhanced with sponsored advertisements related to the uniquely identifiable object. The sponsored advertisements are served from a pre-populated database or are queried in substantially real-time from a remote host. Eligible ads (sponsored termination point, another related uniquely identifiable objects, or a peripheral products or services) can be made available along with each uniquely identifiable object.

16 Claims, 10 Drawing Sheets

(56) References Cited

U.S. PATENT DOCUMENTS

| | | |
|---|---|---|
| 2007/0011050 A1 | 1/2007 | Klopf et al. |
| 2007/0027771 A1 | 2/2007 | Collins et al. |
| 2007/0055569 A1 | 3/2007 | Subramanian et al. |
| 2007/0239531 A1 | 10/2007 | Beaufays et al. |
| 2007/0260516 A1 | 11/2007 | Schoen et al. |
| 2007/0294140 A1 | 12/2007 | Bezos et al. |
| 2008/0140530 A1 | 6/2008 | Van Luchene et al. |
| 2008/0270228 A1* | 10/2008 | Dasdan ............................ 705/14 |
| 2008/0275863 A1* | 11/2008 | Dominowska et al. .......... 707/5 |
| 2009/0019008 A1* | 1/2009 | Moore et al. ..................... 707/3 |
| 2009/0031216 A1 | 1/2009 | Dressel et al. |
| 2009/0043649 A1 | 2/2009 | Wright et al. |
| 2009/0125719 A1* | 5/2009 | Cochran et al. ............... 713/171 |
| 2009/0132363 A1* | 5/2009 | Powell et al. .................... 705/14 |
| 2009/0254512 A1 | 10/2009 | Broder et al. |
| 2009/0254635 A1* | 10/2009 | Lunt ............................ 709/219 |
| 2010/0057559 A1 | 3/2010 | Wilf et al. |
| 2010/0082472 A1* | 4/2010 | Cheung ............................ 705/37 |
| 2010/0153424 A1 | 6/2010 | Portlock et al. |
| 2010/0161408 A1* | 6/2010 | Karson et al. ............. 705/14.43 |
| 2010/0257049 A1* | 10/2010 | Flombaum et al. ....... 705/14.42 |
| 2010/0262488 A1* | 10/2010 | Harrison et al. ........... 705/14.46 |
| 2010/0299190 A1 | 11/2010 | Pratt et al. |
| 2011/0184816 A1 | 7/2011 | Jones et al. |
| 2011/0202423 A1 | 8/2011 | Pratt et al. |
| 2011/0270697 A1 | 11/2011 | Sunkada |
| 2011/0276389 A1 | 11/2011 | Kulkarni et al. |
| 2011/0276394 A1* | 11/2011 | Chan ......................... 705/14.49 |
| 2012/0130816 A1 | 5/2012 | Sakamoto |
| 2012/0197981 A1 | 8/2012 | Chan |
| 2014/0012659 A1 | 1/2014 | Yan |

\* cited by examiner

ADVERTISING OF UNIQUELY IDENTIFIABLE OBJECTS

CROSS-REFERENCES TO RELATED APPLICATIONS

This application claims priority as a continuation-in-part to U.S. patent application Ser. No. 13/523,703, by Schafer et al., entitled ATTRIBUTING INDIVIDUAL PPC VALUES FOR ONLINE ADVERTISING OF UNIQUELY IDENTIFIABLE OBJECTS, and filed on Jun. 14, 2012, as a continuation-in-part to U.S. patent application Ser. No. 13/523,823, by Schafer et al., entitled ADVERTISING UNIQUELY IDENTIFIABLE OBJECTS WITHIN THIRD PARTY SEARCH RESULTS, and filed on Jun. 14, 2012, and as a continuation-in-part to U.S. patent application Ser. No. 13/555,987, by Schafer et al., entitled REAL-TIME ADVERTISING OF UNIQUELY IDENTIFIABLE OBJECTS AMONG THIRD PARTY SEARCH RESULTS, and filed on Jul. 23, 2012, the contents of each being hereby incorporated by reference.

FIELD OF THE INVENTION

The invention relates generally to online advertisements, and more specifically, to online advertisements for uniquely identifiable objects on web pages.

BACKGROUND OF THE INVENTION

Online advertisements are important revenue generators for publishers. As consumers turn away from traditional media to spend more time on the Internet, and increase spending there as well, online advertisements are becoming even more critical. One key concern for marketers is how to effectively target online advertisements to consumers that are interested and likely to buy the specific or even uniquely identifiable product or service, or even inquire or pay attention to the pitch.

Additionally, online advertisements are presented to consumers over an increasing variety of devices, from stationary devices, to tablet devices, and mobile devices. Each has variations in screen size for display, and mechanisms for user interaction. For example, stationary devices provide high bandwidth connections with larger screen sizes (or even multiple screens). By contrast, digital cell telephones have a lower bandwidth and screen size, but can provide user interactions that leverage cell services, such as telephone calls, SMS messages, and GPS capabilities.

One effective way of monitoring the effectiveness of an ad campaign is to use the PPC (pay per click) technique in which marketers are charged only when a user actually clicks on, or otherwise engages with a particular advertisement via one or more of the connection mediums, sponsored to be made available along with the advertised uniquely identifiable objects.

One problem with PPC (pay per click) model is that conventional online publishers, such as major horizontal search engines, do not distinguish PPC advertising campaigns for uniquely identifiable objects (e.g., a used vehicle or real estate) and services from typical advertisements (e.g., of a box of tissue). A uniquely identifiable object (UIO) can be distinguished from all other objects, even those with substantially similar manufacturing specifications. While a UPC (Universal Product Code) specifies a species of product, a uniquely identifiable object is distinguishable even within the product species. Instead, marketers typically purchase a standard advertisement that is selected based on key words or categories.

Moreover, there is no centralized service or exchange to provide third party publishers with advertisements of UIOs or peripheral advertisements related to a UIO being displayed.

What is needed is a technique for the implementation of sponsored online advertisements and associated connection mediums to be made available along with uniquely identifiable objects displayed on 3rd party digital service providers.

SUMMARY

To meet the above-described needs, methods, computer program products, and systems for display of sponsored advertising related to uniquely identifiable objects.

In one embodiment, a publisher displays a web page comprising a uniquely identifiable object (itself sponsored or not). A remote host is queried for one or more sponsored advertisements that are based on the identification information and eligible for display. In some embodiments, the querying is performed in batch by submitting a list of uniquely identifiable objects to be displayed by the publisher. The publisher can verify that a sufficient pay-per-click budget still remains in substantially real-time with display. In other embodiments, querying and verification are performed in substantially real-time with display.

In one embodiment, the sponsored advertisements can include one or more uniquely identifiable objects that are related to the publisher-displayed uniquely identifiable objects. In another embodiment, the sponsored advertisements include affinity advertisements for peripheral goods or services related to the uniquely identifiable objects (e.g. an insurance quote for a vehicle or real estate asset).

In still other embodiments, the advertisements distinguish between connection mediums. The connection mediums can automatically send the customer to a termination point (e.g., URL, spawn instant messenger box, or initiate telephone call). The connection mediums can also expose data allowing the customer to select how to connect (e.g., address, telephone number, or URL). Pay-per-click values can vary according to a connection medium.

Advantageously, search engines, publications, and directories can monetize uniquely identifiable content already being displayed on a web site with sponsored advertisements displayed alongside. At the same time, the web sites receive additional revenue streams from third-party sponsorship.

BRIEF DESCRIPTION OF THE DRAWINGS

In the following drawings, like reference numbers are used to refer to like elements. Although the following figures depict various examples of the invention, the invention is not limited to the examples depicted in the figures.

FIGS. 6A-B are schematic diagrams illustrating web pages with exemplary online advertisements based on uniquely identifiable objects, according to some embodiments.

FIGS. 6C-D are schematic diagrams illustrating web pages with exemplary connection mediums for online advertisements based on uniquely identifiable objects, according to some embodiments.

DETAILED DESCRIPTION

The present invention provides methods, computer program products, and systems for display of sponsored advertisements for uniquely identifiable objects (e.g., by a third party publisher). In general, a uniquely identifiable object can be individually distinguished over all other objects, and even those that have nearly identical manufacturing specifications, by a unique identification code (e.g., a serial number or other type of distinguishing data).

In one exemplary embodiment, an automobile appears on a web site, such as Craigslist.com. Metadata in the web page, or content displayed in the web page, provides a VIN number assigned to the automobile. A client identifies the VIN number for submission to a remote server that stores online advertisements. As a unique identifier, the VIN number can reveal characteristics of the automobile such as model, make, year, and the like. The characteristics can be indicative of certain types of owner categories that are useful for advertising impressions. Therefore, the remote server returns PPC (pay per click) sponsored online advertisements associated with the VIN number, specific to that VIN itself, and any related ads to display along with the uniquely identified object, such as a related vehicles or affinity offerings (i.e., related goods are services that are not necessarily unique).

In another exemplary embodiment, as set forth more fully in U.S. application Ser. Nos. 13/523,823 and 13/555,987, an automobile marketplace web site is a publisher that hosts direct revenue-generating online advertisements or free advertisements submitted directly by sellers. A search engine integrated within the website returns search results to user queries for specific types of automobiles as a SERP (search engine results page). To augment the results, the automobile marketplace web site can also list third-party sponsored advertisements or search results within or along with the other search results. As a result, the automobile marketplace web site can generate additional revenue from connections (e.g., click-throughs to the third party sponsored search results of uniquely identifiable objects, or exposure of connection data).

As used herein, the terms "third party" and "remote" are relative. From a publisher point of view, an advertisement server is a remote, third party. From an advertisement server point of view, the publisher is a remote, third party. The point of views and above terms are used interchangeably herein.

Also, please note that the disclosure herein often refers to automobiles solely for the purposes of thoroughly delineating a preferred embodiment. However, one of ordinary skill in the art will recognize, given the disclosure, that the techniques can be applied to other individually distinguishable products such as real estate or artwork. Further, services such as dentistry can be uniquely identified by time, location and/or a particular dentist within an office.

FIG. 1

Figure 1:
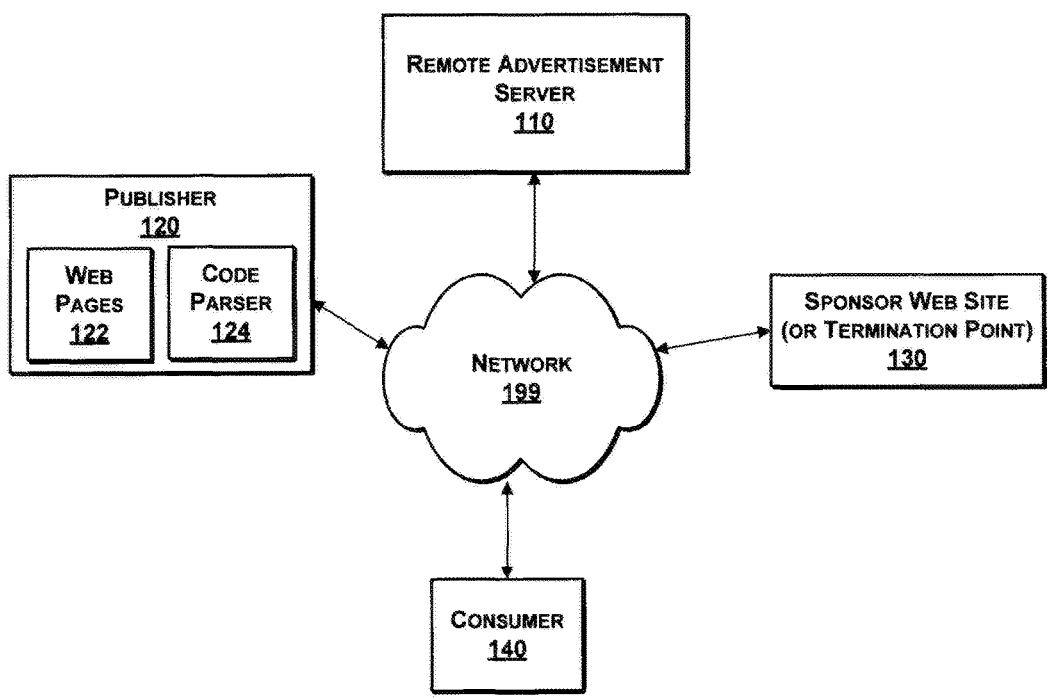
FIG. 1 is a high-level block diagram illustrating a system for advertising uniquely identifiable objects, according to one embodiment.

FIG. 1 is a high-level block diagram illustrating a system 100 for advertising of uniquely identifiable objects, according to one embodiment. The system 100 comprises a remote advertisement server 110, a publisher 120, a sponsor web site (or termination point) 130, and a consumer 140. The components can be coupled to a network 199, such as the Internet, a local network or a cellular network, through any suitable wired (e.g., Ethernet) or wireless (e.g., Wi-Fi or 3G) medium, or combination. Other embodiments of communication channels are possible, including hybrid networks. Additional network components can also be part of the system 100, such as firewalls, virus scanners, routers, switches, application servers, databases, and the like.

The remote advertisement server 110 can be a computer, a set of distributed computers, a server, a virtual server, or the like. The remote advertisement server 110 can be operated by an entity that is independent from an entity operating the publisher 120. In some embodiments, the remote advertisement server 110 stores online advertisements related to uniquely identifiable objects. The online advertisements can be sponsored advertisements having a PPC and campaign budget set by marketers. The online advertisements can include direct marketing of an object, or indirect marketing of related advertisements. For example, a vehicle can be marketed by a used car dealer, and peripheral products to the vehicle, such as CarFax reports, offers to buy your existing car for cash, finance, insurance, new car options, used vehicle parts, and oil change locations can be marketed to potential buyers of the vehicle. Characteristics can be associated with the peripheral products to allow matching to characteristics of objects. Embodiments of the remote advertisement server 110 are discussed in more detail below in association with FIG. 2.

The publisher (or third party) 120 can be a computer, a set of distributed computers, a server, a virtual server, or the like. Examples of the publisher include general search engines (e.g., Google or Bing), marketplaces with vertical search engines (e.g., Cars.com or Amazon.com), marketers, bloggers, news sources, classified publishers, social media providers, third parties, and the like.

Web pages 122 and an optional code parser 124 are included in the illustrated embodiment of the publisher 120. However, in other embodiments, the components are not integrated, and can be owned and/or operated by a third party. The web pages 122 can be static or dynamic web pages that are incorporated to a web site available at a particular domain, or be individual or sub-groups of pages. The content of web pages 122 can relate to commercial products offered by the publisher 120, such as vehicles or resold products. The content of web pages 122 can also be blogs, news articles, social media, multimedia such as images or video, or any other type of content suitable for online viewing. One of more online advertisements are included with a web page. The online advertisements can be provided in real time (e.g., for dynamically generated web pages), or can be pre-processed in batch (e.g., for static web pages).

The code parser 124 can be a process, daemon, operating system module, other application, or hardware that checks the web pages 122 for unique identifiers. In response, the unique identifier is used to retrieve online advertisements for insertion to web pages. In other embodiments, a code parser 124 is not necessary, such as when online advertisements are directly associated with uniquely identifiable objects by a marketer.

The sponsor web site (which is an exemplary termination point) 130 can be an online inventory of products or services of a marketer. In some embodiments, the search engine 125 sends a consumer to the sponsor web site 130. In the case of advertisements based on a search query, the sponsor web site 130 can be displayed within code of a SERP web page controlled by the search engine. Alternatively, a new tab or browser instance can be spawned. Note that the sponsor web site 130 is just one example of a connection medium associated with an advertisement. Connection mediums can include a termination point for automatically forwarding a user, or mere connection data for the user to select how to connect. Exemplary connection mediums include an SMS message, click to expose a complete telephone number, click to initiate a telephone call, an address that can include directions, click for navigation, a VDP (vehicle description page) or other deep link, and the like.

The consumer (or customer) 140 can be an individual, a corporate entity, an automated process, or the like, using a computing device to use the third-party web site. The computing device can be mobile (e.g., a smartphone) or stationary. The consumer 140 can submit queries and click-on sponsored advertisements.

FIG. 2

Figure 2:
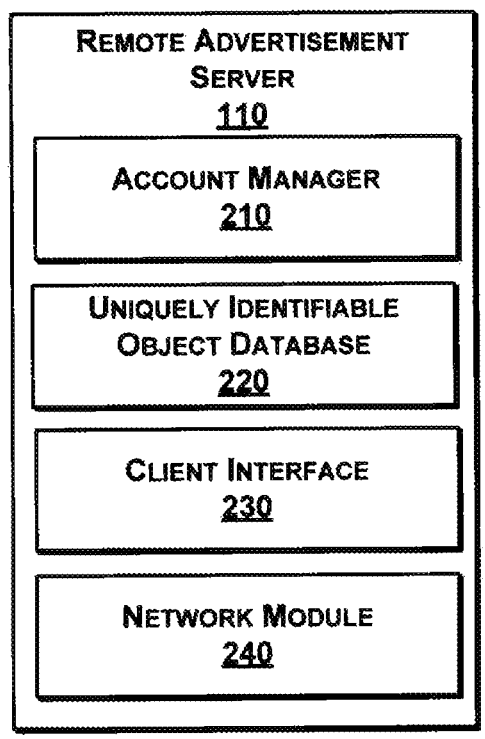
FIG. 2 is a more detailed block diagram illustrating a remote advertisement server of the system of FIG. 1, according to one embodiment.

FIG. 2 is a more detailed block diagram illustrating a remote advertisement server 110 of the system 100 of FIG. 1, according to one embodiment. The remote advertisement server 110 includes an account manager 210, a uniquely identifiable object database 220, a search engine interface 230, and a network module 240. The components can be implemented in hardware, software, or a combination of both.

The account manager 210 is an interface for a marketer to manage online advertisements. Settings can be global to the account, or particular to a uniquely identifiable object. Exemplary settings include a PPC (pay-per-click) value, an overall budget (e.g., a maximum spending allowance, a maximum number of clicks), a per uniquely identifiable object budget, a per uniquely identifiable object bid amount, a bid geography, a fallback termination point, and a marketing agency. In some embodiments, the account manager 210 logs click-throughs. A marketer may access the account manager 210 using a viewer such as a web browser or a local client or API.

The uniquely identifiable object database 220 stores data entered by a marketer about uniquely identifiable objects through the user interface, and stores data harvested from external data sources. For instance, a relational database stores a record for each uniquely identifiable object. Other data stored can include a uniquely identifiable object key (e.g., a unique identification code, such as a serial number, a VIN, or the like), a marketer identification, a bid amount, a termination point, a daily maximum, and a time stamp (i.e., record last updated), and external data (e.g., Carfax.com data). A user interface allows the marketer to control PPC values. There are many ways for a user to control PPC values (e.g., programmatically, selectively, overriding, rules, algorithms, etc.).

Advertisements can be indexed in the uniquely identifiable object database 220 according to identification data. The identification data can be, for example, unique identification codes, serial numbers, VINs, addresses, or any other appropriate data to uniquely identify each object. The objects can be distinguished even if manufactured to the same specifications. In one implementation, VINs are not available for cars manufactured prior to 1981, so a unique identification code can be generated. The method for generating the code can be made available to a publisher to utilize locally and/or alternatively, recipients of the generated code can be provide a key. Other data can also be sent along with the identification data. If an advertisement is an enriched listing, information can be downloaded ahead of time (e.g., multimedia files).

Additionally, advertisement identifiers can be stored in a record. The advertisement identifiers are used as pointers to online advertisements stored either locally or on a separate advertisement server. In further details of the local storage implementation, online advertisements can be stored in the uniquely identifiable object database 220. Each online advertisement can include characteristics for matching against uniquely identifiable objects. For example, a certain car model and a range of years can be specified as appropriate for a CarFax online advertisement. In U.S. application Ser. No. 13/523,703, techniques for populating a uniquely identifiable object database are described in further detail.

The publisher interface 230 communicates with search engines concerning sponsored search results or sponsored advertisements (e.g., eligibility of advertisements). In a first instance, the publisher interface 230 provides listings from the uniquely identifiable object database 220 to include in SERPs. In an embodiment, identification data for the listings are provided in batch during overnight data transfers. The listings can be updated during specified intervals between batch transfers. For example, VINs, bids, and other data for automobiles can be provided to a website like Lemonfree.com.com or Amazon.com for pre-processing against a local database, as described in more detail below.

The network module 240 provides lower-level interfaces with external devices such as remote search engines. The network module 240 translates commands sent and received according to a specific protocol or API (application programming interface). Moreover, network cards manage the transmission of data over a network with the external devices using IEEE standards.

Figure 3:
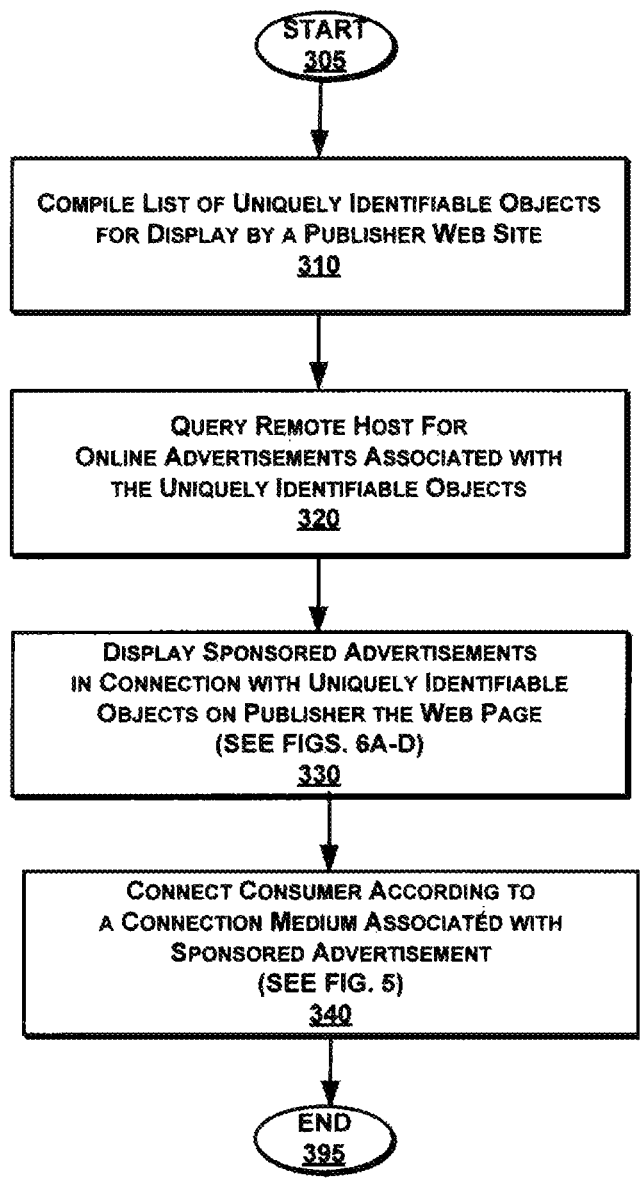
FIG. 3 is a flow diagram illustrating a method for advertising uniquely identifiable objects, according to one embodiment.

FIG. 3 (and FIGS. 6A-D)

FIG. 3 is a flow diagram illustrating a method 300 starting at 305 and ending at 395) for identifying sponsored advertisements associated with uniquely identifiable objects, according to one embodiment. The method 300 can be implemented by, for example, the publisher 120 of FIG. 1.

At step 310, a list of uniquely identifiable objects for display by a publisher webs site is compiled. For example, a classified auto sales publisher can sort a database and extract identification information for each classified advertisement (whether sponsored or not). In another example, an auto review or auto news website can search web pages available on an HTTP server and extract identification information for discovered uniquely identifiable objects.

In yet another embodiment, the uniquely identifiable object is identified from sources in addition to, or other than a current web page. Other sources include web browsing history, one or more uniquely identifiable objects that are associated with a web page other than through source code, such as by a database, cookies, user preferences, and the like. In one embodiment, a dynamic list of uniquely identifiable objects is associated with a user or consumer (e.g., past purchases). In still other embodiments, more than one uniquely identifiable object can be identified. More specifically, a group of uniquely identifiable objects can be identified.

At step 320, a remote host for sponsored advertisements can be queried (e.g., in real time or in batch). The identification information is sent to the remote host for processing as described more fully in association with FIG. 4. In one embodiment, the remote host generates pairing clusters that match sponsored advertisements to uniquely identified objects. Pair clusters can leverage human collective engagement data, an attribution technique that programmatically extracts and decodes the attributes of uniquely identifiable objects, rates the attributes, and matches likeness by attribute matching to attributes of uniquely identifiable objects for sponsored advertisements (or attributes of affinity advertisements). The resulting online advertisements are then received or activated in part or whole from local supplied files. The online advertisements can be displayed as sent, or taken as suggestions subject to local decision making about whether they are included in a web page.

Figure 6A:
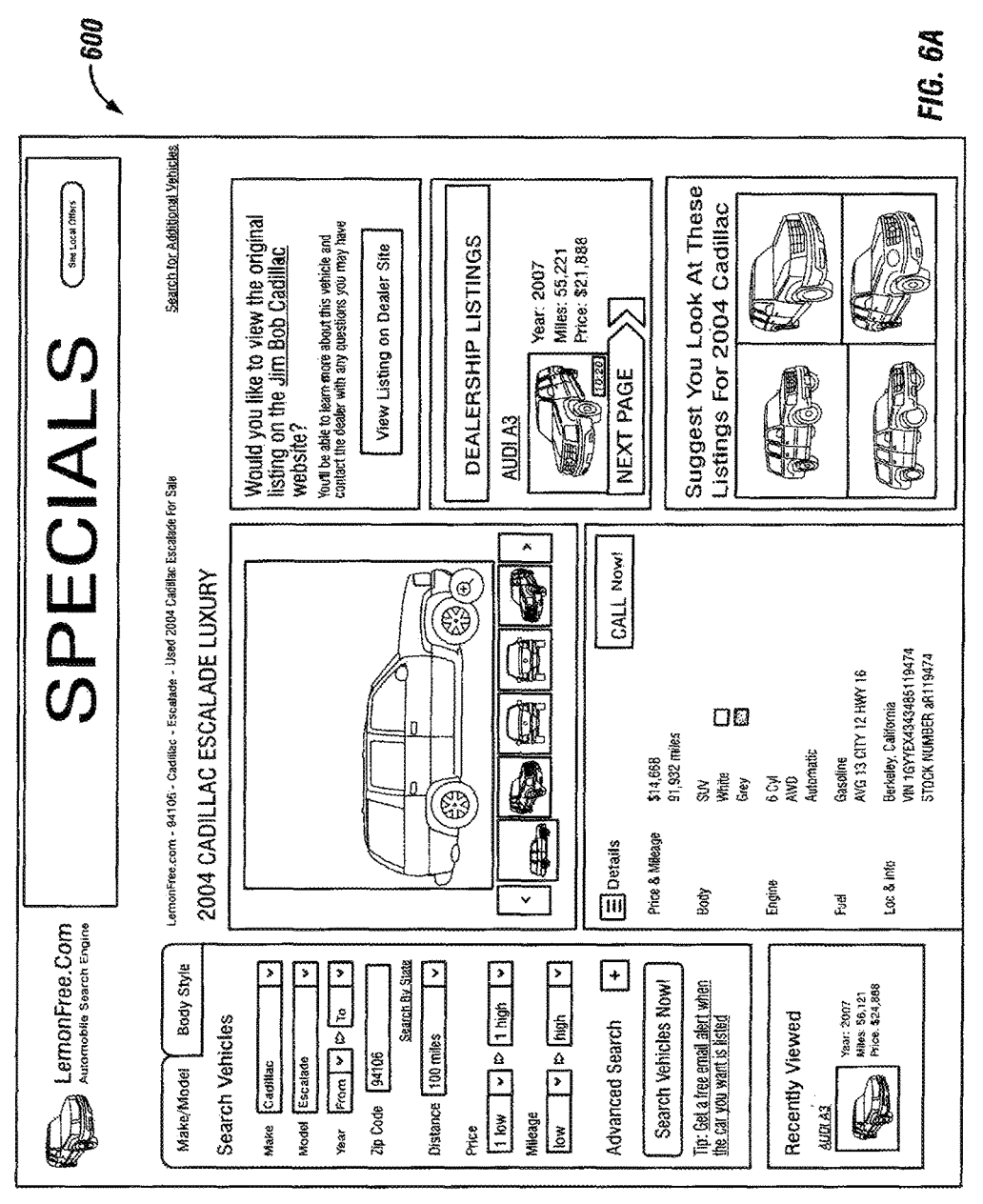
Figure 6B:
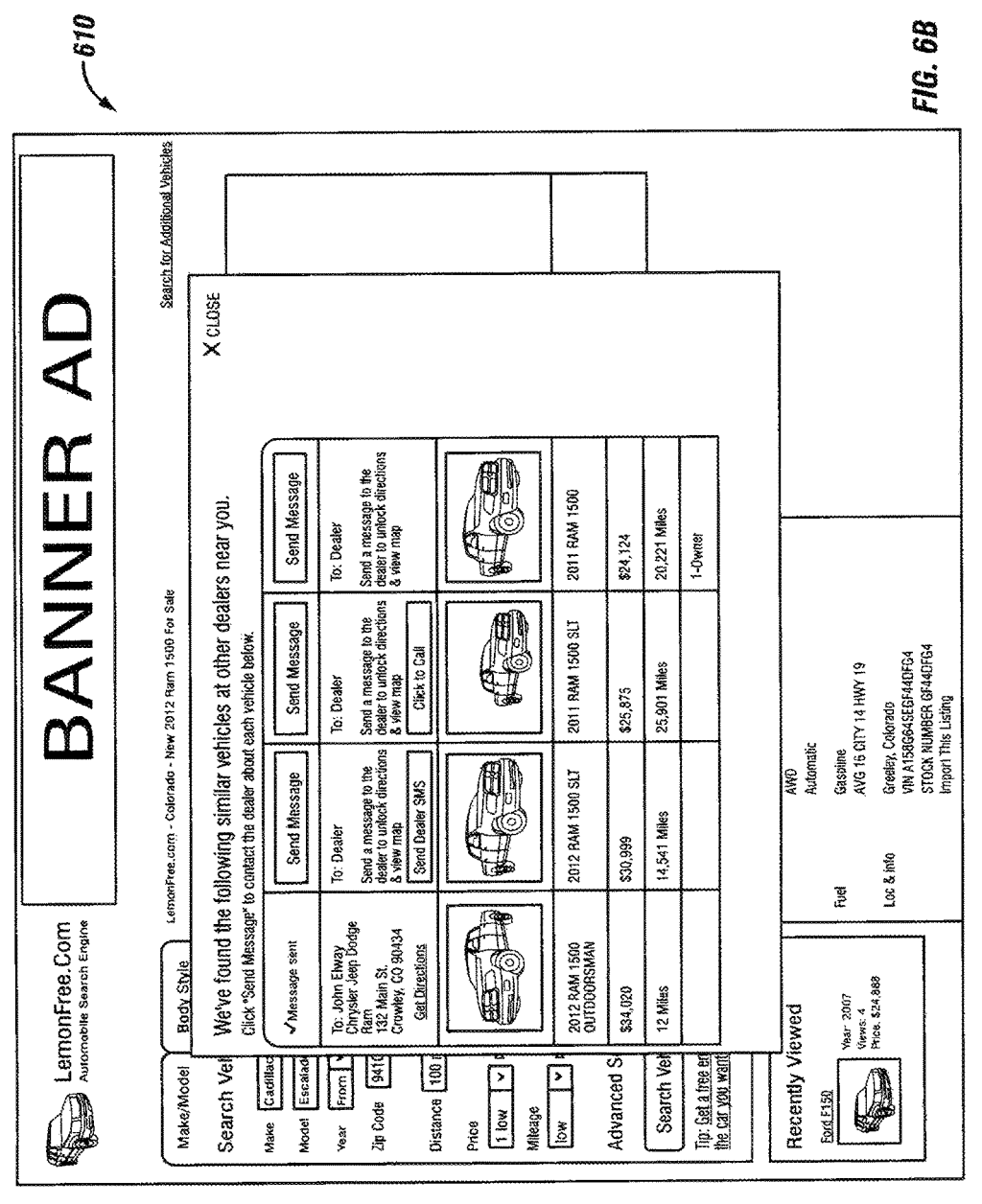
Figure 6C:
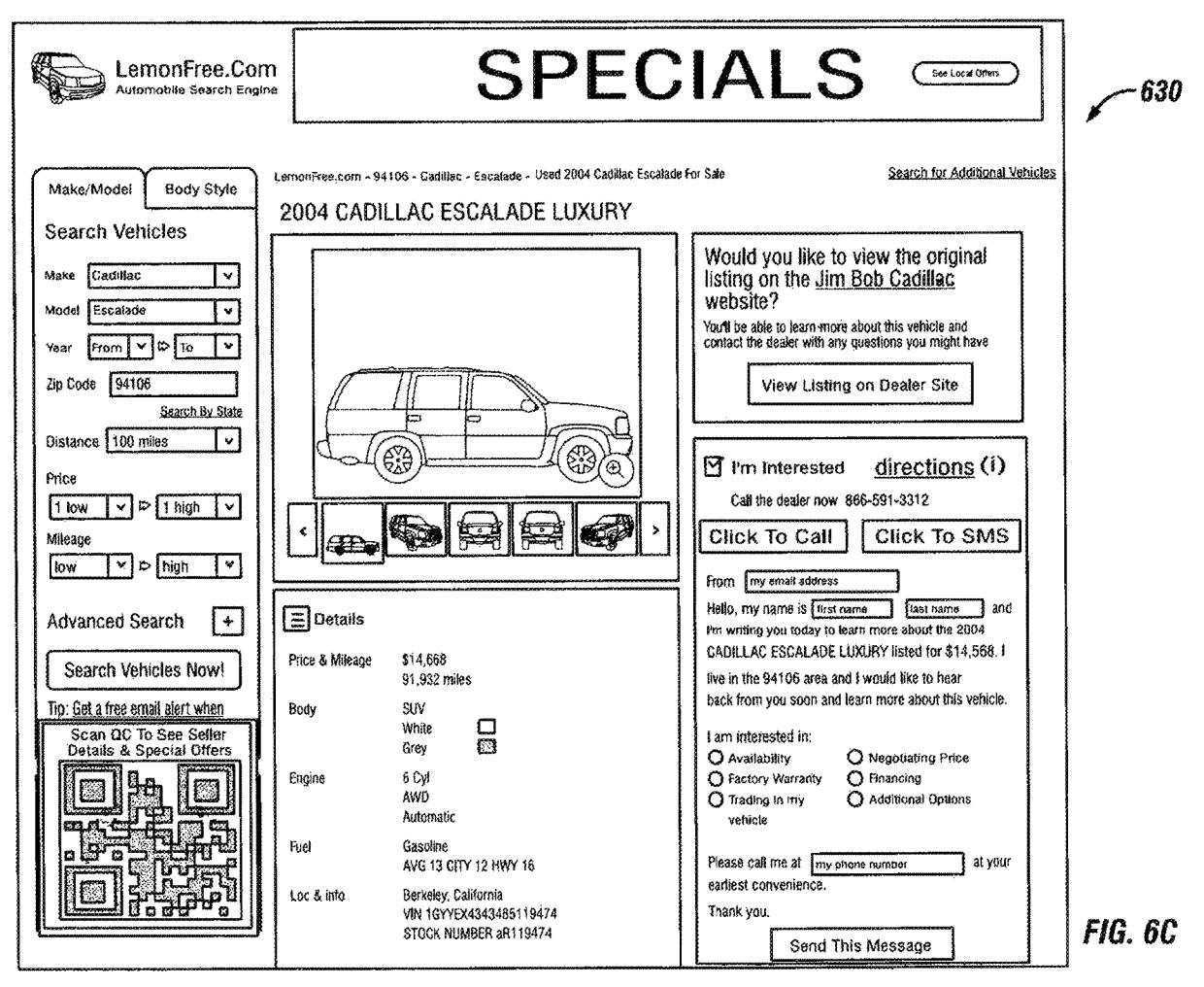
Figure 6D:
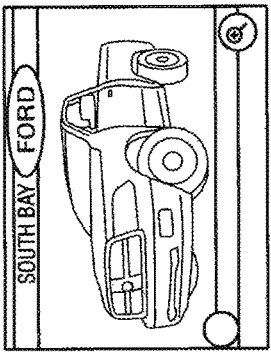

At step 330, sponsored advertisements are displayed in connection with the web page. The online advertisement can be displayed numerous different ways. In one example, display is integrated with a web page (e.g., SERP results). In another example, display is separated into a separate web page, tab, or shadow box as shown in FIGS. 6A-B (including screenshots 600 and 610). Display of various termination points are shown in FIGS. 6C-D (including screenshots 630 and 640). Additional display examples include a banner (static or dynamic rotational) or a container (e.g., an ad box) of a web page. In the ad box, one or more uniquely identifiable object listings are displayed along with one or more PPC termination. In still another example, the advertisement can be displayed outside of the browser, such as directly on a desktop or within an application window.

Figure 5:
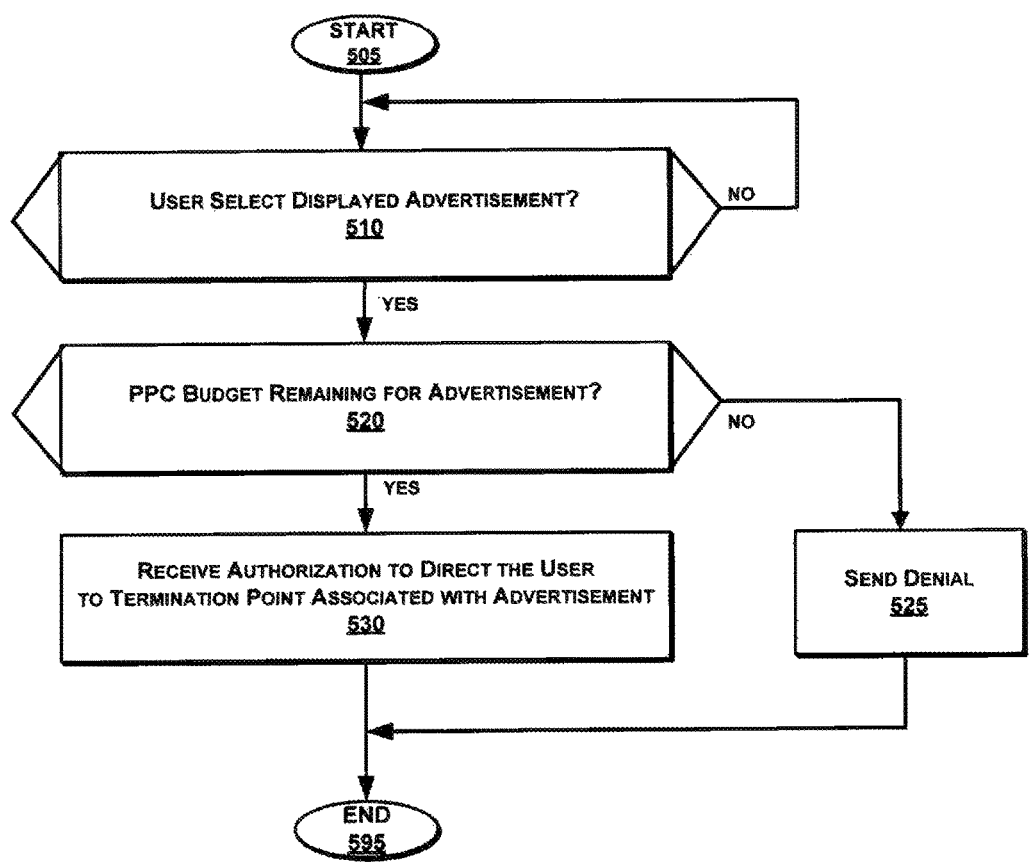
FIG. 5 is a flow diagram illustrating a method for connecting a user to a termination point or sponsored data, according to one embodiment.

At step 340, a user is connected to a connection medium (e.g., a termination point or connection data) associated with the sponsored advertisement. In some embodiments, a campaign budget is verified once a user selects an online advertisement and prior to being sent to a termination point, as detailed in FIG. 5. In alternative embodiments, a budget is not verified in real time, but in batch (e.g., daily, or hourly). Note that batch verification uses less overhead, but can lead to a publisher displaying sponsored advertisements without any remaining budget. Advertisements with expired budgets are pulled from rotation, although there may be some impressions for advertisements that expire in between batch verifications. Regarding termination points, one of ordinary skill in the art will recognize numerous alternatives for sending a user to a marketer or sponsor, given the disclosure herein. In a preferred embodiment, the termination point is a URL (Universal Resource Locator) reachable through a network. Other exemplary termination points include maps or an address with directions, instantiation of instant messenger boxes connecting a customer to a marketer, a telephone number, SMS message, e-mail message, and the like. Additional embodiments of step 340 are shown in FIG. 5.

FIG. 4

Figure 4:
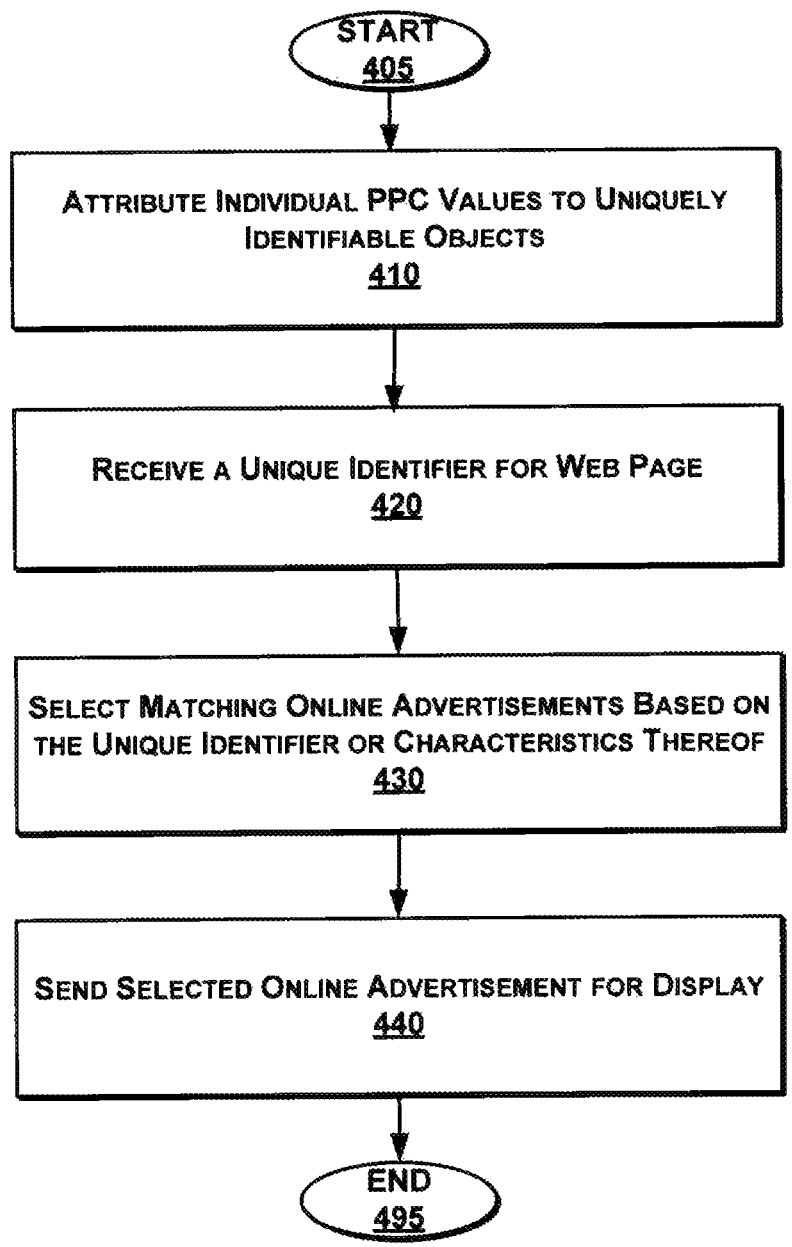
FIG. 4 is a flow diagram illustrating a method providing sponsored advertisements and individual PPC values and connection mediums, according to one embodiment.

FIG. 4 is a flow diagram illustrating a method 400 (staring at 405 and ending at 495) for providing online advertisements and individual PPC values for uniquely identifiable objects, according to one embodiment. The method 400 can be implemented by, for example, the remote advertisement server 110 of FIG. 1.

At step 410, individual PPC values to uniquely identifiable objects are attributed. A marketer can enter data through a user interface. As a result, individual click values, overall campaign budgets, and termination points are configured.

At step 420, a unique identifier corresponding to a uniquely identifiable object on a web page is received. As discussed, there can be more than one unique identifier. Additional conditions can also be received, such a geographical location, information about a user viewing the web page, time of day, and the like.

At step 430, a matching online advertisement of a uniquely identifiable object is suggested based on the presence and attributes (e.g., bid amount, relevancy) of an individual PPC value. Matching can be a direct correspondence to a unique identifier. Additionally, the unique identifier can be used as an index for characteristics that are used for keywords associated with an object. If other conditions are sent with the unique identifier, the conditions can also be used for keywords. If more than one online advertisement, individual PPC values can be determinative of which advertisements are selected. Selection between multiple advertisements can be performed at the server, or locally by the publisher.

At step 440, a selected online advertisement is sent for display. The display can be implemented in many different ways, as described herein.

FIG. 5

FIG. 5 is a flow diagram illustrating the step 340 (starting at 505 and ending at 595) for connecting a consumer to a termination point, according to one embodiment. The step 340 can be implemented in, for example, remote advertisement server 110 of FIG. 1.

At step 510, an online advertisement is displayed until selected by a user. In some instances, the online advertisement rotates among other online advertisements, or reaches a time out. In other instances, a browser window containing the advertisement can be closed.

At step 520, a PPC budget for the advertisement is verified. To do so, one embodiment sends an advertisement identifier and optionally, a type of connection medium selected, to a remote advertisement server. The verification allows the remaining PPC budget to be decremented based on the user selection. Different termination points can vary in PPC values. In one embodiment, verification is not necessary. The user clicks are recorded in real-time, the updates of available advertisements can be provided in substantially real-time or in periodic batches (e.g., hourly or daily) and those batches can be updated locally based on the publisher's schedule.

At step 525, if authorization is not given due to an expired budget, execution of the termination point is denied. In this case, a default termination point can be substituted, or the user can simply receive an exception message.

Step 530, if the PPC budget has not been expired, authorization to direct the user to a termination point or otherwise make available the sponsored connection method associated with the advertisement is received. In some cases, the termination point is sent with the online advertisement. In other cases, the termination point is sent upon selection (e.g., a dynamic termination point).

FIG. 7

Figure 7:
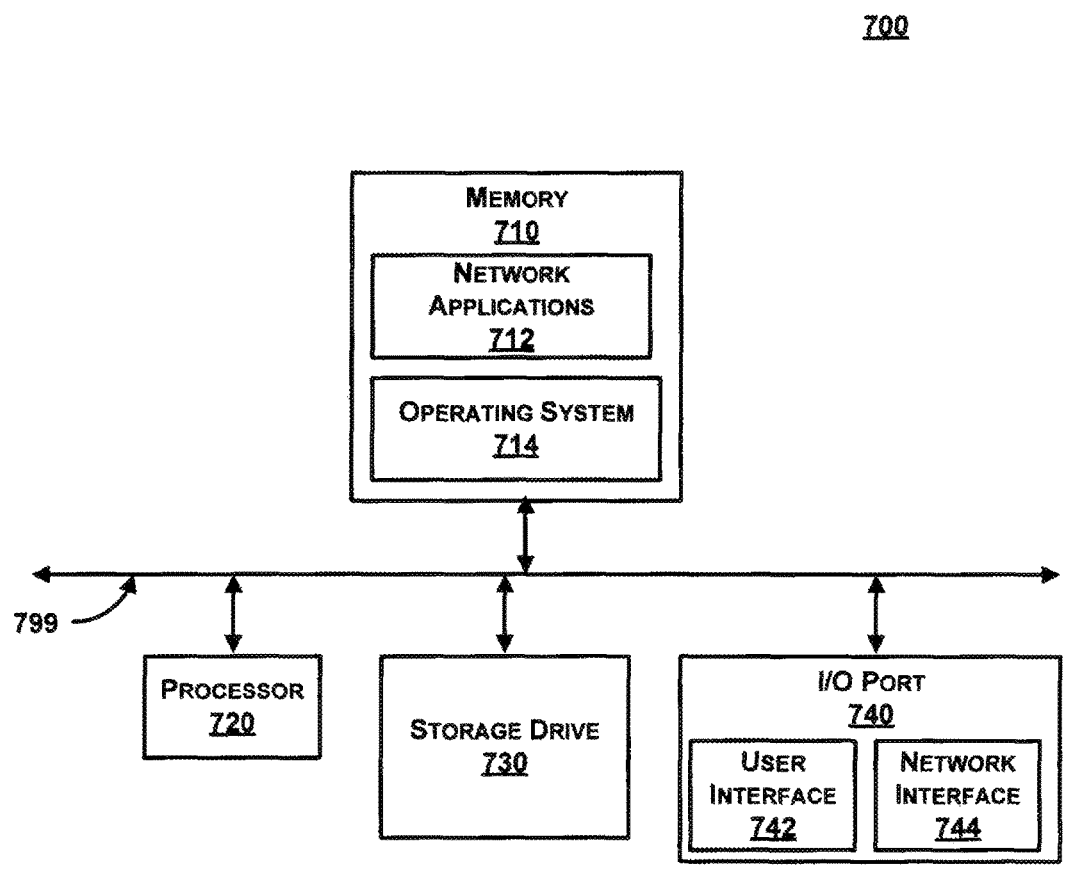
FIG. 7 is a block diagram illustrating an exemplary computing device, according to one embodiment.

FIG. 7 is a block diagram illustrating an exemplary computing device 700 for use in the system 100 of FIG. 1, according to one embodiment. The computing device 700 is an exemplary device that is implementable for each of the components of the system 100, including the remote advertisement server 110, the publisher 120, the sponsor web site 130, and the consumer 140. Additionally, the system 100 is merely an example implementation itself, since the system 100 can also be fully or partially implemented with laptop computers, tablet computers, smart cell phones, Internet appliances, and the like.

The computing device 700, of the present embodiment, includes a memory 710, a processor 720, a hard drive 730, and an I/O port 740. Each of the components is coupled for electronic communication via a bus 799. Communication can be digital and/or analog, and use any suitable protocol.

The memory 710 further comprises network applications 712 and an operating system 714. The network applications 712 can include the modules of advertisement server 115 of FIG. 2. Other network applications can include a web browser, a mobile application, an application that uses networking, a remote application executing locally, a network protocol application, a network management application, a network routing application, or the like.

The operating system 714 can be one of the Microsoft Windows® family of operating systems (e.g., Windows 95, 98, Me, Windows NT, Windows 2000, Windows XP, Windows XP x64 Edition, Windows Vista, Widows 7, Windows CE, Windows Mobile), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

The processor 720 can be a network processor (e.g., optimized for IEEE 802.11), a general purpose processor, an application-specific integrated circuit (ASIC), a field programmable gate array (FPGA), a reduced instruction set controller (RISC) processor, an integrated circuit, or the like. Atheros, Broadcom, and Marvell Semiconductors manufacture processors that are optimized for IEEE 802.11 devices. The processor 720 can be single core, multiple core, or include more than one processing elements. The processor 720 can be disposed on silicon or any other suitable material. The processor 720 can receive and execute instructions and data stored in the memory 710 or the storage drive 730.

The storage drive 730 can be any non-volatile type of storage such as a magnetic disc, EEPROM, Flash, or the like. The storage drive 730 stores code and data for applications.

The I/O port 740 further comprises a user interface 742 and a network interface 744. The user interface 742 can output to a display device and receive input from, for example, a keyboard. The network interface 744 connects to a medium such as Ethernet or Wi-Fi for data input and output.

Many of the functionalities described herein can be implemented with computer software, computer hardware, or a combination.

Computer software products (e.g., non-transitory computer products storing source code) may be written in any of various suitable programming languages, such as C, C++, C#, Java, JavaScript, PHP, Python, Perl, Ruby, and AJAX. The computer software product may be an independent application with data input and data display modules. Alternatively, the computer software products may be classes that are instantiated as distributed objects. The computer software products may also be component software such as Java Beans (from Sun Microsystems) or Enterprise Java Beans (from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. A computer-implemented method for rule-based distribution of PPC (pay-per-click) sponsored online advertisements related to uniquely identifiable objects displayed on web pages, in an advertising exchange server, the method comprising:

receiving identification information for one or more uniquely identifiable objects from a publisher server, the one or more uniquely identifiable objects for display by a publisher web site, wherein a uniquely identifiable object comprises an object that is individually identified amongst physically identical objects;

querying a database, at the advertising exchange server, for a plurality of sponsored online advertisements that are based on the identification information and eligible for display, the advertising exchange server maintaining third-party sponsored online listings submitted by third-party marketers for advertising, the advertising exchange server being independent of a plurality of publishing devices that display third-party sponsored online listings, wherein each uniquely identifiable object has an individual PPC value, the advertising exchange server determining the plurality of sponsored online advertisements by matching each advertisement of the plurality of sponsored online advertisements against the one or more uniquely identifiable objects based on attributes of the individual PPC value of each uniquely identifiable object; and sending one or more of the plurality of sponsored online advertisements for uniquely identifiable objects responsive to the identification information; and in response to one of the one or more uniquely identifiable objects being selected for display by the publisher web site, verifying that the one of the one or more sponsored online advertisements remains eligible for display with respect to pay-per click budget.

2. The method of claim 1, wherein receiving identification information, comprises:

in response to the one or more uniquely identifiable objects being selected for display by the publisher web site, receiving identification information for the one or more uniquely identifiable objects from a publisher.

3. The method of claim 1, further comprising:
receiving the plurality of sponsored online advertisements from marketers, each advertisement associated with a specific uniquely identifiable object; and
receiving an identification of the uniquely identifiable objects to associate with the plurality of sponsored online advertisements.

4. The method of claim 1, further comprising:
receiving the plurality of sponsored online advertisements from marketers, each advertisement generally related to uniquely identifiable objects; and
receiving parameters for associating the plurality of sponsored online advertisements with uniquely identifiable objects.

5. A computer-implemented method for rule-based distribution of PPC (pay-per-click) sponsored online advertisements related to uniquely identifiable objects on web pages, the method comprising:
compiling a list of uniquely identifiable objects with associated identification information for display by a publisher server, wherein a uniquely identifiable object comprises an object that is individually identified amongst identical objects;
querying an advertising exchange server for a plurality of sponsored online advertisements that are based on the identification information of the list of uniquely identifiable objects for display and eligible for display, the advertising exchange server maintaining third-party sponsored online listings submitted by third-party marketers for advertising, the advertising exchange server being independent of a plurality of publishing devices that display third-party sponsored online listings, wherein each uniquely identifiable object has an individual PPC value, the advertising exchange server determining the plurality of sponsored online advertisements by matching each advertisement of the plurality of sponsored online advertisements against the list of uniquely identifiable objects based on attributes of the individual PPC value of each uniquely identifiable object;
storing the plurality of sponsored online advertisements related to the list of uniquely identifiable objects;
responsive to displaying a web page from the publisher that includes a uniquely identifiable object from the list of uniquely identifiable objects, displaying a particular sponsored online advertisement in connection with the web page; and
responsive to a user selection of the particular sponsored online advertisement, verifying, with the advertising exchange server, authorization to send a user to a termination point with regards to a pay-per-click budget.

6. The method of claim 5, wherein the particular online advertisement is displayed in at least one of: the web page, a separate web page from the uniquely identifiable object, a frame of the web page, a browser tab of the web page, a separate browser tab from a tab of the web page, a shadow box, a pop-up window, and a desktop.

7. The method of claim 5, wherein the online advertisement comprises at least one of: a static banner, a dynamic rotating banner, and an ad box.

8. The method of claim 5, wherein querying the advertising exchange server comprises:
responsive to a user selection of the online advertisement, querying the advertising exchange server for the one or more sponsored online advertisements.

9. The method of claim 5, further comprising:
responsive to a user selection of the particular sponsored online advertisement, sending a user to the termination point associated with the online advertisement or making data available for a user-selected connection medium to a marketer.

10. The method of claim 5, wherein the identification information comprises a VIN (vehicle identification number), or another unique identification code, and the uniquely identifiable objects comprise vehicles.

11. The method of claim 5, wherein the identification information comprises a serial number.

12. A non-transitory computer-readable medium storing source code that, when executed by a processor, performs a method for rule-based distribution of PPC (pay-per-click) sponsored online advertisements related to uniquely identifiable objects displayed on web pages, in an advertising exchange server, the method comprising:
receiving identification information for one or more uniquely identifiable objects from a publisher server, the one or more uniquely identifiable objects for display by a publisher web site, wherein a uniquely identifiable object comprises an object that is individually identified amongst physically identical objects;
querying a database, at the advertising exchange server, for a plurality of sponsored online advertisements that are based on the identification information and eligible for display, the advertising exchange server maintaining third-party sponsored online listings submitted by third-party marketers for advertising, the advertising exchange server being independent of a plurality of publishing devices that display third-party sponsored online listings, wherein each uniquely identifiable object has an individual PPC value, the advertising exchange server determining the plurality of sponsored online advertisements by matching each advertisement of the plurality of sponsored online advertisements against the one or more uniquely identifiable objects based on attributes of the individual PPC value of each uniquely identifiable object; and
sending one or more of the plurality of sponsored online advertisements for uniquely identifiable objects responsive to the identification information; and
in response to one of the one or more uniquely identifiable objects being selected for display by the publisher web site, verifying that the one of the one or more sponsored online advertisements remains eligible for display with respect to pay-per click budget.

13. The computer-readable medium of claim 12, wherein the method further comprises:
in response to the one or more uniquely identifiable objects being selected for display by the publisher web site, receiving identification information for one or more uniquely identifiable objects from a publisher server.

14. The computer-readable medium of claim 12, wherein the method further comprises:
receiving the plurality of sponsored online advertisements from marketers, each advertisement associated with a specific uniquely identifiable object; and
receiving an identification of the uniquely identifiable objects to associate with the plurality of sponsored online advertisements.

15. The computer-readable medium of claim 12, wherein the method further comprises:
  receiving the plurality of sponsored online advertisements from marketers, each advertisement generally related to uniquely identifiable objects; and
  receiving parameters for associating the plurality of sponsored online advertisements with uniquely identifiable objects.

16. An advertising exchange server to distribute PPC (pay-per-click) sponsored online advertisements related to uniquely identifiable objects displayed on web pages in an advertising exchange server, comprising:
  a processor; and
  a memory, storing:
  a first module to receive identification information for one or more uniquely identifiable objects from a publisher server, the one or more uniquely identifiable objects for display by a publisher web site, wherein a uniquely identifiable object comprises an object that is individually identified even amongst physically identical objects;
  a second module to query a database for a plurality of sponsored online advertisements that are based on the identification information and eligible for display, the database maintaining third-party sponsored online listings submitted by third-party marketers for advertising, the advertising exchange server being independent of a plurality of publishing devices that display third-party sponsored online listings, wherein each uniquely identifiable object has an individual PPC value set by a third-party marketer, the advertising exchange server determining the plurality of sponsored online advertisements by matching each advertisement of the plurality of sponsored online advertisements against the one or more uniquely identifiable objects based on attributes of the individual PPC value of each uniquely identifiable object; and
  a third module to send one or more of the plurality of sponsored online advertisements for uniquely identifiable objects responsive to the identification information; and
  a fourth module to, in response to one of the one or more uniquely identifiable objects being selected for display by the publisher web site, verify that the one of the one or more sponsored online advertisements remains eligible for display with respect to pay-per click budget.

* * * * *